SOLDERING METHODS AND APPARATUS

Original Filed Sept. 10, 1962 3 Sheets-Sheet 1

INVENTORS
SOLOMON C. OSBORNE
JOSEPH D. KELLER

BY Julian C. Renfro
ATTORNEY

SOLDERING METHODS AND APPARATUS

Original Filed Sept. 10, 1962 3 Sheets-Sheet 2

INVENTORS
SOLOMON C. OSBORNE
JOSEPH D. KELLER

BY Julian C. Renfro
ATTORNEY

SOLDERING METHODS AND APPARATUS

Original Filed Sept. 10, 1962 3 Sheets-Sheet 3

INVENTORS
SOLOMON C. OSBORNE
JOSEPH D. KELLER
BY Julian C. Renfro
ATTORNEY

United States Patent Office 3,605,244

Patented Sept. 20, 1971

3,605,244

SOLDERING METHODS AND APPARATUS

Solomon C. Osborne, Orlando, and Joseph D. Keller, Winter Park, Fla., assignors to Electrovert Manufacturing Co. Ltd., Montreal, Quebec, Canada Continuation of application Ser. No. 222,453, Sept. 10, 1962. This application Apr. 20, 1966, Ser. No. 551,475

Int. Cl. B23k *31/02*

U.S. Cl. 29—471.1 23 Claims

ABSTRACT OF THE DISCLOSURE

This invention relates to an automatic soldering machine particularly designed for use in connection with the manufacture of printed circuit boards or the like, which utilizes nozzle means for projecting molten solder in a curvilinear stream having an upper surface presenting a crest above the level of the nozzle, and to one side thereof. Upon the undersurface of the item to be soldered being brought into contact with the stream of solder, the effective soldering of the components is brought about. Means are provided for applying a thin film of oxidization-preventing oil over the curved upper surface of the solder stream, and additionally, the arrangement may include means for subjecting the completed circuit board to a flow of refrigerated gas that serves to quickly extract heat, thus preventing formation of excessively crystalline or grainy solder joints.

This case is a continuation of our patent application Ser. No. 222,453, filed Sept. 10, 1962.

This invention relates to improvements in soldering, and more particularly to improved methods and apparatus for soldering connections such as between the wire leads of electrical components and conductor means on insulated panels in the form of printed circuit boards or the like.

The increased use of electronic sub-assemblies in which large numbers of electrical components are mechanically and electrically connected by soldering to conductor means on insulating panels has created a demand for means and methods whereby large numbers of such connections can be soldered rapidly on a production line basis. Moreover, such sub-assemblies are often used in aircraft, missile, and like applications wherein extreme conditions of vibration, shock, and other stresses exist, therefore requiring solder connections which are not only electrically reliable but also mechanically strong and resistant to fatigue.

A good solder joint or connection is characterized by a fine grain structure in the solder and by a relatively thin and regular intermetallic zone between the solder and the metal of the elements being connected. Additional characteristics indicative of a good solder joint are well filleted layer of solder having a bright finish and making a relatively small angle of contact with the conductor strip or other base element. Conversely, coarse, grainy solder and a relatively irregular and thick intermetallic zone, excess solder making a large angle of contact with the base element, and a dull surface showing crystalline formations under magnification, are all characteristic of a weak solder joint which is likely to crack or separate under stress and to result in a mechanical and electrical failure.

It has been proposed heretofore to solder a plurality of connections by dipping them into the surface of a stationary body of molten solder in a vat, or by moving the connections through the crest of a flowing stream of molten solder so that as the connections are moved out of the solder supply, a quantity of solder clings thereto under the effects of adhesive and cohesive forces, generally referred to as surface tension, overcoming the forces of gravity tending to prevent solder from leaving the supply. Such practices have been troubled with "bridging" and "icicling" by excess solder resulting from inability of gravational forces to overcome by the forces holding the excess solder to the connection. Attempts have been made prior to this invention to decrease oxidation and surface tension of the solder, and hence to reduce bridging and icicling, by forcefully squirting a jet of oil onto the moving stream of solder adjacent to the joints to be soldered or by mixing the oil directly with the solder. These measures have resulted in undesirable turbulence in the solder, lack of adequate coverage of the flowing solder by the oil, loss of heat from the solder to the oil, and excessive quantities of oil being left on the workpiece thereby introducing subsequent cleaning problems.

It is therefore an important object of this invention to provide soldering apparatus comprising nozzle means for forming an arcuate stream of molten solder and including means for applying a uniform, thin film of oxidation-preventing oil over the curved upper surface of the solder stream without introducing uncontrollable turbulence in the stream or causing material cooling thereof by the oil. According to the invention, this is accomplished by providing an oil reservoir at the nozzle opening with the reservoir defined in part by the moving surface of the solder stream as it leaves the nozzle, so that the stream is merely wiped by the oil as the solder traverses the reservoir and picks up a film of oil which is on the order of several molecules in thickness. The reservoir is conveniently supplied with oil by duct means which drip make-up oil therein at a suitable rate.

Another problem, encountered heretofore in attempts to effect soldering of printed circuit board connections by moving the board through engagement with the crest of a stream of solder flowing in the opposite direction to the board movement, is the creation of a back-wash or damming up of solder at the junction of the stream with the board at the point or line of emergence of the board from the stream. Heretofore the excessive back-wash solder has tended to accumulate and spill or run along conductor strips in the direction of board travel, and to cause "icicles" and bridging of conductors, as well as forming excess solder at the junctures of component leads with the conductor strips. This has been particularly so in the soldering of printed circuit board connections wherein the board has a series of transversely extending conductor strips which cause repeated shock and vibration in the back-wash as they emerge therefrom.

It is therefore another important object of this invention to reduce the amount of back-wash or dammed up solder by providing an exit path therefor by which the back-wash solder can re-enter the main solder stream.

We have discovered that the backwash solder can be effectively channeled for re-entry into the solder stream by causing the stream to be impressed with forces which result in striations or ripples in the surface thereof when not contacted by a workpiece, with the striations and ripples extending parallel to the direction of flow. When a work piece such as a printed circuit board engages the crest of the stream, the backwash is drawn into and fills the striations or valleys between the peaks of ripples so that the backwash is materially reduced in size and the board is fully contacted across the width thereof by solder. In one preferred form of apparatus embodying the invention, the nozzle through which solder is forced comprises wall means for guiding the solder upwardly and a deflector wall portion disposed at an angle of about 47° from the vertical to impose a change of direction on the solder as it issues from the nozzle. It has been found that forcefully causing the solder to flow into a stream in this manner causes the desired ripples and striations to be formed even without providing means such as serrations, projections or other configurations on the deflector wall, although the invention contemplates the use of such means when more predictable ripples are desired.

Yet another problem sometimes encountered in prior soldering practices resides in the tendency of oil to form a coating on the solder joint which inhibits the dissipation of heat therefrom and results in "cooking" or holding the joint at relatively high temperatures for a period of time after solidification, during which time the growth of large crystals or grainy structure is promoted in the solder and intermetallic zones of the joint. This has been found especially true in the case of soldered connections on printed circuit boards or the like because the insulating board serves as a heat sink which absorbs large quantities of heat during the soldering process and gives up large quantities of heat to the joint for an appreciable time after solidification of the solder. The increased graininess of the solder and irregularity of the intermetallic zones in the cooked joints substantially weakens the connections making them unreliable for use under conditions of stress. Moreover, oil coated solder joints on printed circuit boards have had to cool from the outside in and so have been subjected to thermal stresses which also further the growth of crystalline or grainy solder structure and at times even cause separation or cracking of the solder due to unbalance of shrinkage forces.

We have discovered, however, that a fine grain structure of the solder, and a thin, regular intermetallic zone may be produced, while still retaining the icicle and bridge preventing qualities of an oil or flux coating, by extracting heat from the interior of the solder joint in such a manner as to minimize temperature differentials within the solder while accelerating the cooling thereof. This is preferably accomplished, in the case of printed circuit boards for example, by directing a cooling medium such as cold air or other fluid against unsoldered portions of the component leads exposed on one side of the board so that the board serves as an insulating shield between the cooling medium and solder joint while the wire leads serve as heat conductors which dissipate heat from inside the oil coated joints to the cooling medium. The joint is thereby chilled or quenched rapidly and evenly throughout so as to prevent formation of excessively crystalline or grainy solder and to promote the formation of a fine, thin, and regular intermetallic zone between the solder and the joined metals of the lead and conductors.

It is therefore another important object of this invention to provide a method of making improved solder joints for metallurgical bonding of metal elements to form superior mechanical and/or electrical soldered connections, and comprising the steps of flowing molten solder over the joints to be joined, providing a heat shield on one side of the joint with a portion of one of the elements extending beyond the heat shield, and subjecting that portion to a cooling medium.

As another object this invention aims to provide improved soldering apparatus including means for applying molten solder to metallic elements to be joined, and means for extracting heat from the interior of the joint as by directing a flow of coolant such as cold air against a member extending from within the joint, whereby the solder is caused to be cooled or quenched rapidly after solidification thereof with minimum temperature differentials and stresses occurring therein.

Another object of this invention is the provision of apparatus for soldering component leads to conductor means on printed circuit boards or the like and comprising means for forming an arcuate, oil coated stream of molten solder and for moving the boards so as to bring the leads and/or conductor means to be soldered into and out of contact with the curved surface of the solder stream with the direction of movement being opposite to the direction of solder flow, and comprising means for thereafter subjecting unsoldered portions of component leads or conductors to a flow of refrigerated air or nitrogen as a chilling medium, preferably in the neighborhood of −50° F., so that the soldered joints are cooled in a rapid and even manner to produce strong reliable connections.

It is another object of the invention to provide apparatus of the foregoing character wherein the flow of chilling medium is controlled by directional means such as baffles so as to be applied to the exposed portions of the leads a predetermined time after the joint leaves the solder stream so that the liquid solder on the joint has time to reach a quiescent state after the shock or jarring of separation from the solder stream occurs. In addition, the invention contemplates the control of flow rate of the chilling medium in accordance with the position of the work piece with respect to the directional control means and with respect to the solder stream by means such as photo-electric cells for sensing the position of the workpiece.

Other objects and advantages of soldering methods and apparatus embodying this invention will become apparent from the following detailed description of a preferred embodiment and method of practice thereof, read in conjunction with the accompanying sheets of drawings forming a part of this specification and in which FIG. 1 is a vertical sectional view of soldering apparatus embodying the present invention taken along the path of travel of a workpiece;

Figure 1:
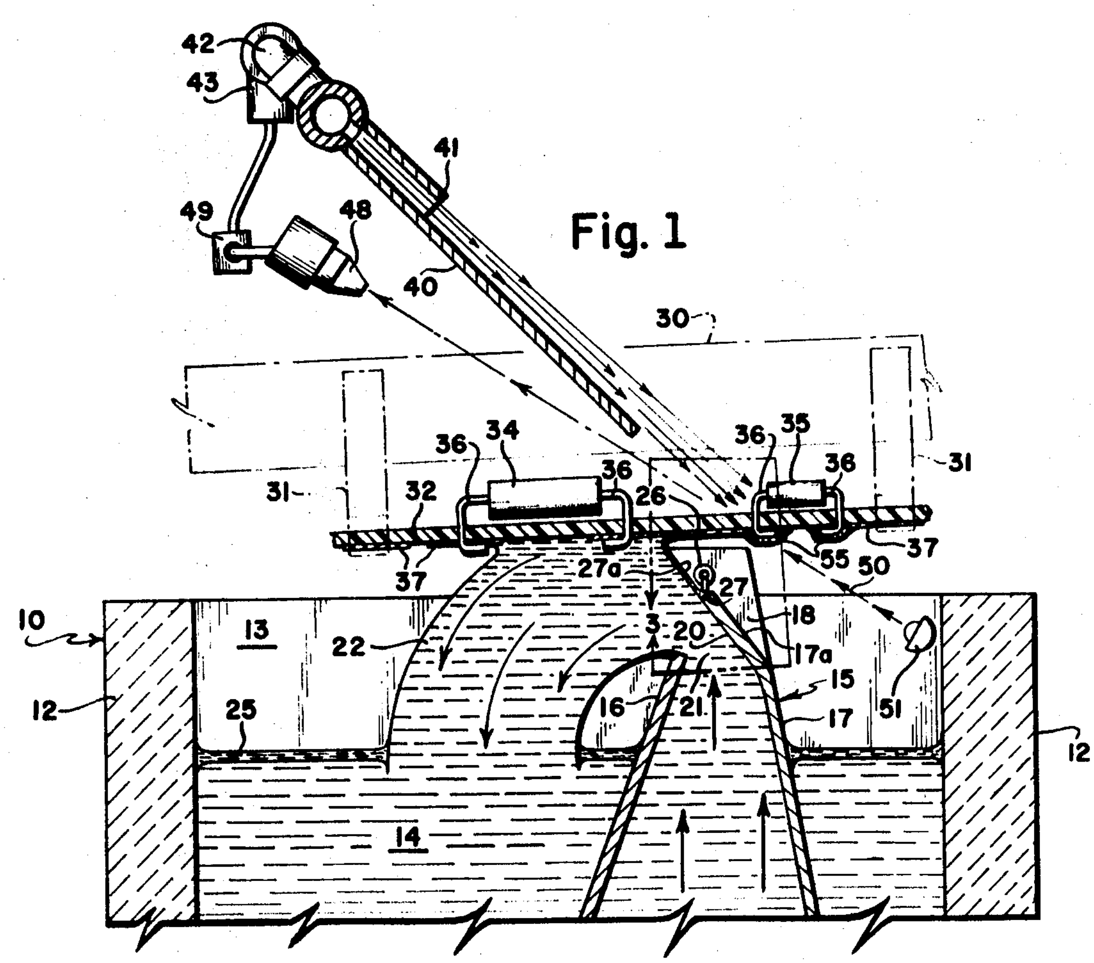
Figure 2:
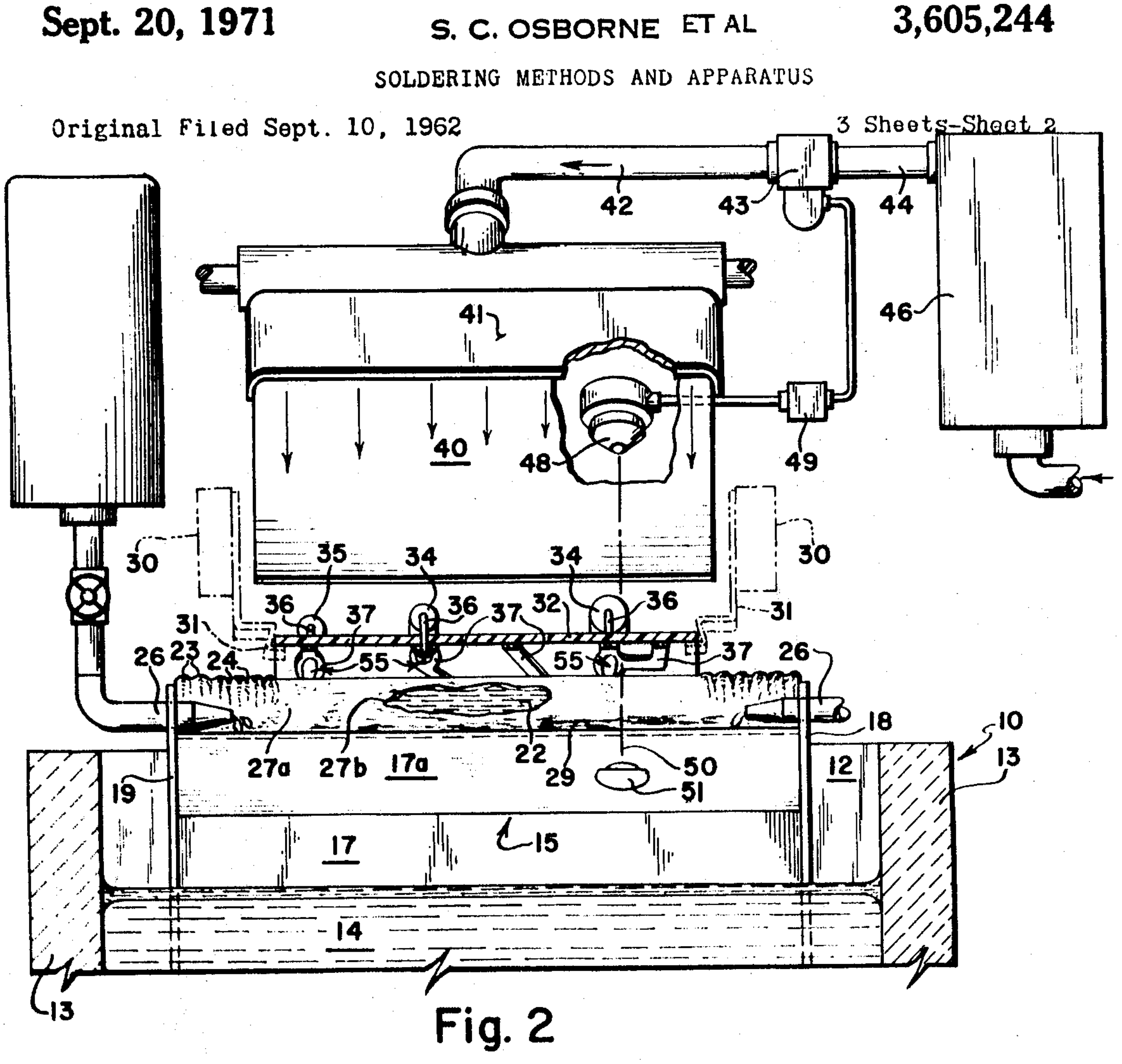
FIG. 2 is a vertical sectional view of the apparatus of FIG. 1, taken transversely of the line of travel.

Although this invention may be practiced in the production of improved solder joints or connections between other elements and for other purposes, the invention will be described hereinafter with reference to the soldering of electrical connections between the wire leads of electrical components and conductor strips on printed circuit boards. Referring to FIGS. 1 and 2 of the drawings, there is illustrated therein that portion of an automatic soldering apparatus which embodies the present invention. The apparatus includes a tank 10 having end walls 12 and side walls 13 formed of a suitable refractory material for containing therein a body of molten solder 14, for example 60–40 tin and lead solder at a temperature of about 500° F.

Within the tank 10 there is disposed a solder projecting nozzle 15 having a sloping front wall 16 and a sloping rear wall 17 disposed between side walls 18 and 19. The upper portion 17*a* of rear wall 17 extends above front wall 16 and is bent forwardly to provide a solder deflecting surface 20 above an elongated solder discharge orifice 21 defined between side walls 18 and 19 by the upper edge of wall 16 and wall portion 17*a*. The deflecting surface 20 is preferably disposed at an angle of approximately 47° from the vertical. Solder is withdrawn from the lower portion of the body of solder in tank 10 and forced by pump means (not shown) upwardly through nozzle 15 and out discharge orifice 21 to form a curvilinear stream 22 of molten solder which returns into the main confines of the tank.

Figures 3, 4, 5:
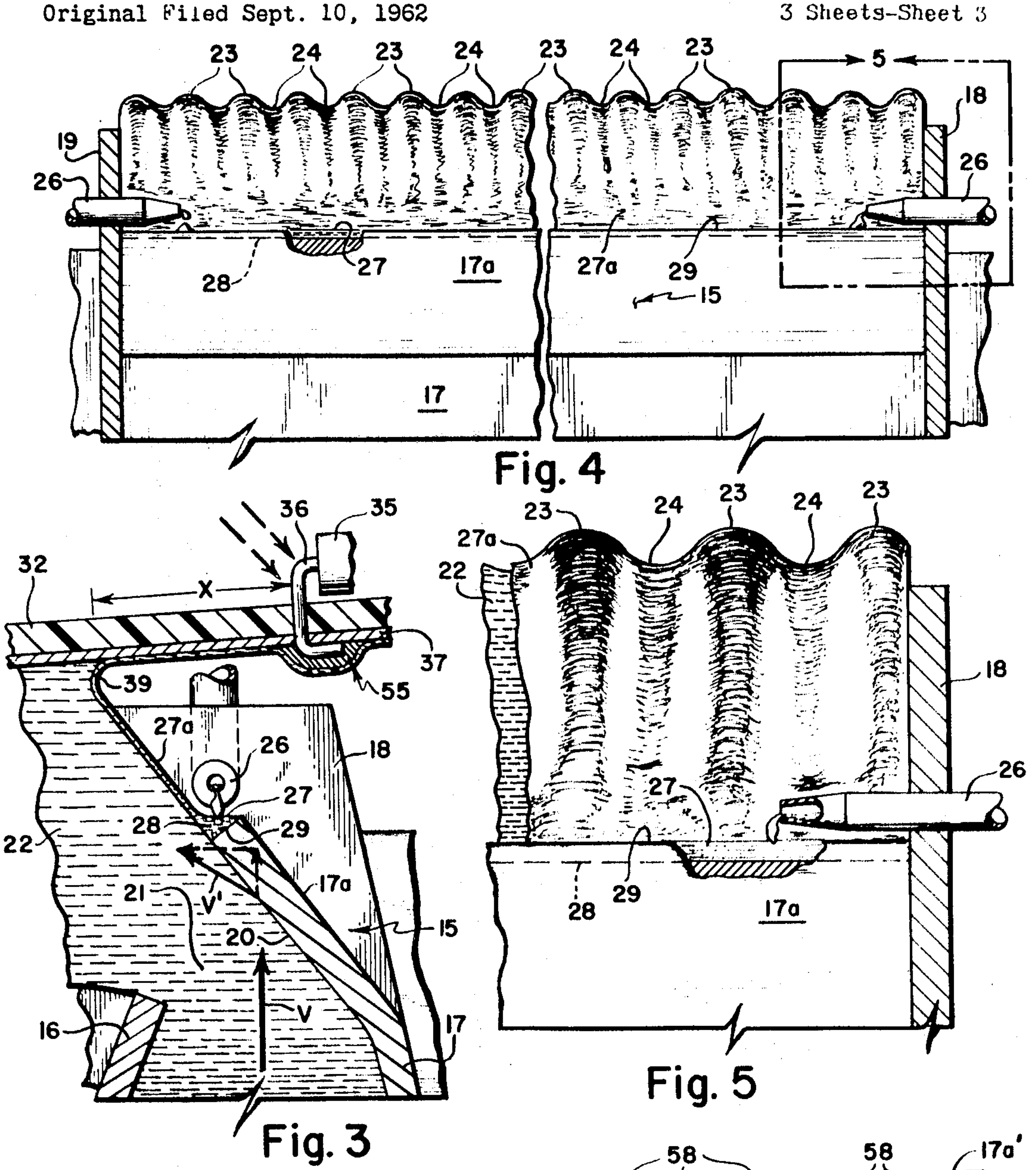
FIG. 3 is an enlarged fragmentary sectional view illustrating the portion of the apparatus denoted by the area enclosed by line 3 in FIG. 1.
FIG. 4 is an enlarged view of the nozzle portion of the apparatus illustrating ripple formations in the solder stream prior to engagement by a workpiece.
FIG. 5 is an enlarged fragmentary view of the area denoted by line 5 of FIG. 4, with a portion broken away to illustrate an oil reservoir.

As the solder flows through the nozzle 15 and issues as a stream 22, the deflecting surface 20 diverts a portion of the solder stream momentum vector V (FIG. 3) into a downward force. This effect reduces the vertical or upward force component and also the total velocity of the stream as shown at V′. A downward flow tendency and a resultant shock effect are produced at random points in the upper surface of the solder stream which cause ripples 23 to be formed in the upper surface thereof as is shown in FIGS. 4 and 5. The ripples 23 extend in the direction of flow with striations or valleys 24 formed therebetween, the purpose and effect of which will become apparent as the description proceeds. Any suitable solder pumping means may be used for effecting the discharge from nozzle 15, for example such as the pump disclosed in U.S. Pat. No. 2,993,272. It is necessary, however, that the solder issue with sufficient force to rise a substantial distance above the upper edge of the wall portion 17*a*.

In order to prevent oxidation of the surface of the body of solder within the tank 10, a layer 25 of oil is floated on the surface of the solder where it forms a barrier to air. Likewise, to prevent oxidation of the solder flowing in stream 22 a pair of oil feeder ducts 26 extend inwardly through nozzle side walls 18 and 19 of the nozzle 15 and discharge a small flow of oil 27 in the form of a mere trickle or drops into a reservoir 28, best illustrated in FIGS. 3 and 5, defined between a sloping upper edge 29 of wall portion 17*a* and the moving surface of the solder stream 22 itself. This reservoir 28 holds a small body of oil 27 so that the moving surface of the stream 22 is wiped by the oil as the solder issues from the nozzle 15. The surface of the stream picks up a thin film 27*a* of the oil 27, on the order of several molecules in thickness. A portion of the film 27*a* is broken away at 27*b* in FIG. 2, and it will be understood that the film is exaggerated in thickness in the various views.

The film of oil serves as an effective barrier to the air which would oxidize the surface solder and increase the surface tension thereof, a condition which adversely affects the forming of good solder joints. It will be recognized that because the oil is applied to the moving solder by gentle wiping of the surface thereof, there is no turbulence introduced into the solder stream. Additionally, the manner of application limits the thickness of the oil layer thereby reducing heat loss from the solder stream to the oil. The presence of the oil on the solder stream promotes the formation of good solder joints in a manner which will presently be made apparent.

The apparatus comprises conveyor means 30, shown in phantom in FIGS. 1 and 2, having depending spring hook members 31 which resiliently grip the edges of a workpiece in the form of a printed circuit panel or board 32 for transportation thereof into contact with the crest of the stream 22 of liquid solder. Carried on the board 32 are a plurality of electrical components such as resistors 34 and 35 having their body portions disposed adjacent to the upper surface of the board 32, and having their wire leads 36 extending through openings in the board with the terminal portions crimped over into engagement with metallic conductor strips 37 arranged in a predetermined patten on the underside of the board. The board 32 is formed of a heat resisting and electrically insulating material, while the wire leads and conductor strips are formed of a suitable metal such as copper. The terminal portions of the wire leads are adapted to be soldered to the conductor strips 37 to provide a good mechanical and electrical connections between the resistors and the printed circuit board 32 as the board is advanced by the conveyor means 30 from left to right as viewed in FIG. 1 over the solder stream 22 which issues from nozzle 15, with the solder at the crest of the stream flowing in the opposite direction to movement of the board.

When the board 32 is moved over the arcuate stream 22 of solder, at a rate of about 10 inches per minute in this example, the lower surface of the board makes contact with the ripples 23 at the crest of the stream. As may best be seen in FIG. 3, the solder tends to dam up and form a zone of backwash solder 39 at the point or line of emergence or breakaway of the printed circuit board with respect to the solder stream 22. Heretofore, the backwash solder 39 has accumulated and spilled or run along conductors in the direction of board travel, and caused "icicles" and bridging of conductors together with excess solder formations at the junctures of the component leads 36 and the conductor strips 37, referred to herein simply as soldered joints or connections. This condition was aggravated by the formation of a tenacious solder oxide film on the backwash solder 39 causing excess solder to cling to the leads and conductors instead of breaking away from the joints at the region of separation of the board from the stream crest or backwash area.

The present invention not only elimniates the formation of a tenacious solder oxide film by the addition of the oil film 27*a*, as described above and illustrated in FIGS. 1–3, but also overcomes the tendency of the backwash solder 39 to accumulate and spill or run off along the conductors 37 by the provision of the previously mentioned valleys 24 between the ripples 23, which valleys provide pathways for the excess or backwash solder 39 to follow and reunite with the stream 22. The solder leaving the backwash fills in the valleys 24 so that the printed circuit board is in contact with solder across the full breadth of the board 32 and the solder flows between and around the leads 36 and conductors 37 to be joined.

Because the wire leads 36 and the conductor strips 37 have been previously cleaned and flux coated, the solder flows evenly thereover and thoroughly wets or coats the prepared metal surfaces. As may be seen in FIG. 1, the leading end of the conveyor 30 is elevated slightly to an angle of about 2½° with the horizontal, which angle is approximately the angle of frictional repose for liquid solder. As the soldered connections leave the stream 22 and backwash solder 39, the combined forces of gravity, momentum of flowing solder, and cohesive forces in the stream, tend to pull excess solder from the connections. Adhesive and cohesive forces, generally termed surface tension, also act to cause a quantity of solder to cling to the connections to form a solder joint.

The presence of the oil film 27*a* on the solder stream 22 prevents surface oxidation and decreases the surface tension thereof, thereby allowing the solder on the joint to separate more readily from the solder supply so that only the desired quantity of solder clings to the joint. The oil also forms a surface protecting and thermal insulating film on the joints as they leave the stream. The reduction in size of the backwash 39 by providing exit channes in the form of valleys 24 together with application of the oil to the stream by gentle wiping so as to eliminate turbulence, cooperate to produce solder joints which are markedly free of excess solder, icicles, and bridging. Moreover, the relative lack of turbulence and vibration in the stream 22 and backwash 39 is conducive to the attainment of a quiescent or equilibrium condition in the solder clinging to a joint before the solder begins to solidify. This is an important factor in producing strong, fine grain solder joints since disturbances of the type mentioned produce relatively weak, coarse grained solder joints.

The present invention includes the use of means for effecting rapid chilling or quenching of the solder connections or joint, after solidification or "freezing," without introducing large temperature differentials therein. This promotes the retention of a particularly fine grained solder structure with a uniform and thin intermetallic zone between the leads 36 and the solder and between the strips 37 and the solder, whereby a particularly strong joint is formed which is resistant to the stresses of shock and vibration a well as providing good electrical connection. To this end, the apparatus comprises means for subjecting the wire leads 36 on the upper side of the board 32 to a cooling medium so that the leads 36 act as heat conductors for extraction of heat from the interior of the soldered joint while the oil coating on the exterior of the joint reduces heat loss directly to the air. This combination has been found to produce an even and controllable rate of cooling throughout the solder of the joint.

In the preferred example described herein, this is accomplished by the provision of a blast of refrigerated air, or other gas, directed against the leads 36 in a strict relationship to the emergence of the soldered joints from the stream of solder 22. Thus, a baffle plate 40 (FIG. 1) is disposed over the path of travel of the boards 32 at an angle of approximately 40° to the horizontal and serves as a deflector for a stream of pressurized and refrigerated air issuing from an elongated nozzle 41 disposed at the upper end of baffle plate 40 and connected by a supply line 42 to one side of a solenoid actuated valve 43. Valve 43 is connected by a line 44 to the outlet of a refrigerating unit 46 which is adapted to dehumidify and cool air or other gas to the desired low temperature, and in the present example the air is refrigerated to a temperature of approximately −50° F.

The control valve 43 is actuated by a photoelectric cell 48 connected through suitable relay means 49 to provide a blast of refrigerated air when a printed circuit board 32 passes over the stream of solder 22 and interrupts a light beam 50 from a light source 51 disposed below the path of travel of the printed circuit boards. The flow of cold air continues until the trailing edge of the printed circuit board passes and permits the beam of light 50 to fall once again upon the photoelectric cell 48, at which time the valve 43 is closed or nearly closed. The valve 43 may be prevented from closing fully so as to allow a small flow of refrigerated air through the nozzle 41 to prevent possible blockage thereof by condensed and frozen moisture, and also to assure a continuous presence of cold air in the supply line 42 and nozzle 41 for immediate delivery to the leads 36 when a board interrupts the light beam 50. It will be noted from FIGS. 1 and 3 that the baffle plate 40 is so positioned that the leads 36 do not move into the cold air flow until they have traveled an appreciable distance *x* from the point of emergence of the respective connection from the solder stream. This allows the oil coated solder on the connection time to become quiescent before solidifying. Furthermore, since the cold air stream is deflected in the direction of travel of the printed circuit board 32 and components thereon, a means is provided which cools the components while extracting heat from the board, and therefore protects certain heat sensitive components such as transistors and others from overheating and consequent damage to their characteristics or structure.

Figure 6:
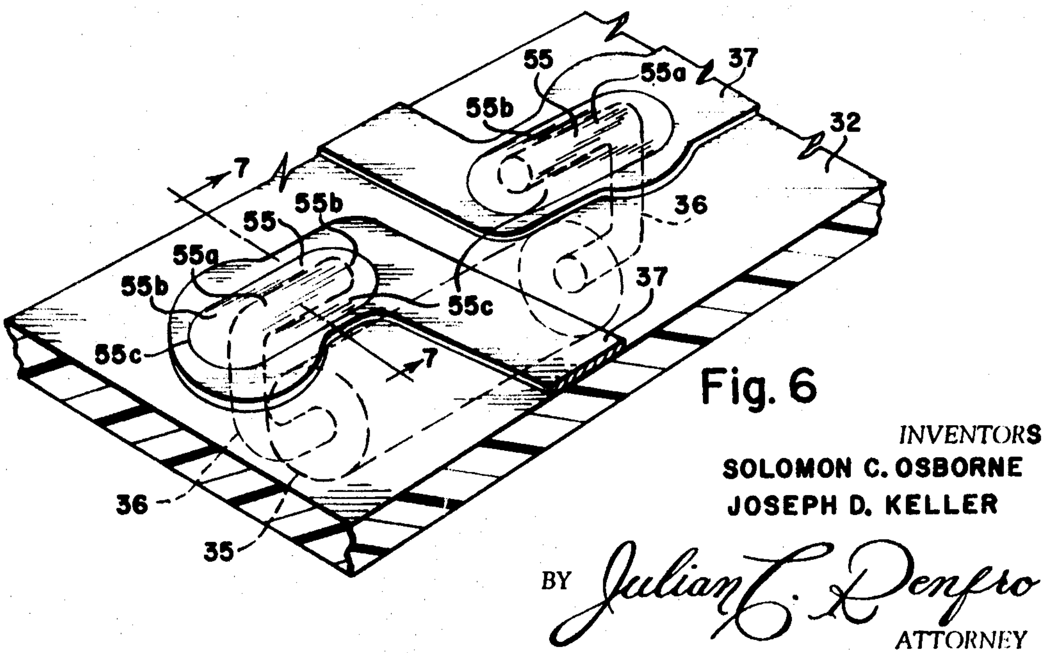
FIG. 6 is a fragmentary perspective view of a joint soldered by the apparatus of FIG. 1.
Figures 7, 8, 9:
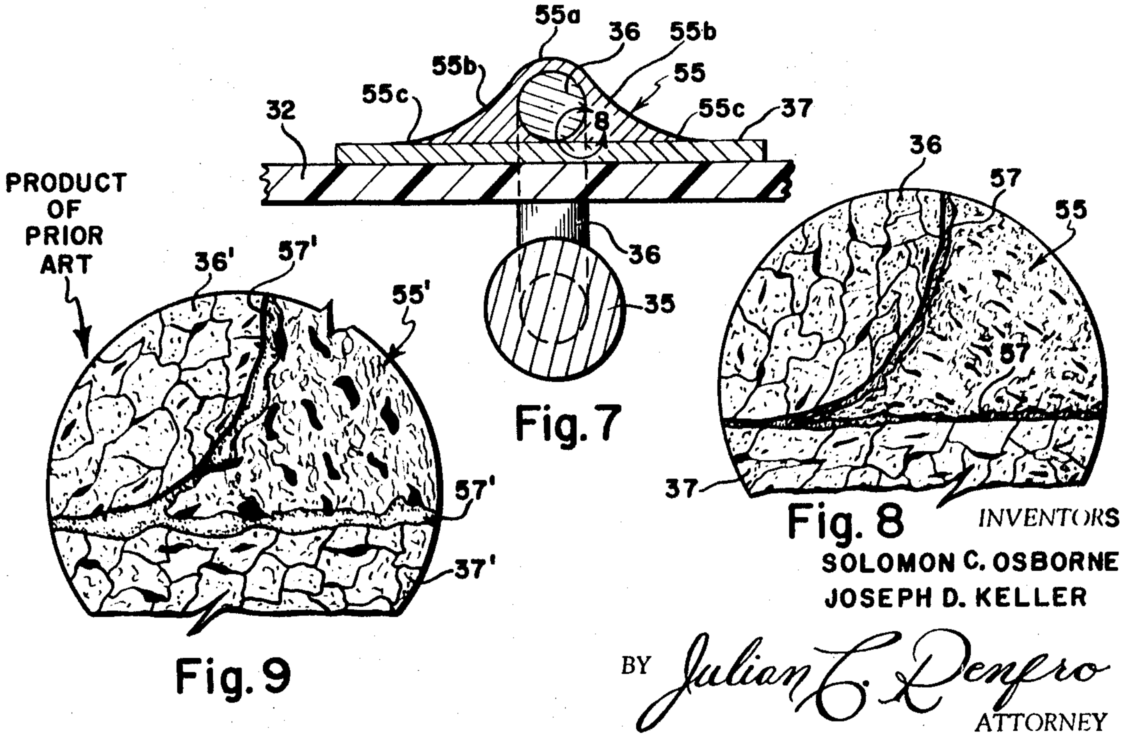
FIG. 7 is a sectional view taken along line 7—7 of FIG. 6.
FIG. 8 is a view of an area within the circle 8 of FIG. 7 showing the metal structure magnified about one thousands times.
FIG. 9 is a magnified view similar to FIG. 8 but showing the metal structure of a joint made by conventional methods and apparatus.

Referring now to FIGS. 6 and 7, there is illustrated therein a solder joint formed according to this invention wherein the wire lead 36 is mechanically and electrically joined to a metal conductor strip 37 by solidified solder 55 which is exaggerated somewhat in thickness but follows the outer curvature of the wire lead 36 as at 55*a* and has well formed concave or filleted areas 55*b*, and makes a small angle with the surface of the conductor strip 37 as at 55*c*. The surface of the solder 55 is coated with a film of oil, not shown, and presents a bright and shiny surface. The solder 55 has a fine grain structure as is shown in FIG. 8 which represents a photomicrograph of a section of the solder joint of FIG. 7, shown under a magnification of one thousand times. Between the solder 55 and the wire lead 36 and between the solder 55 and the conductor strip 37, are formed intermetallic zones 57 which may be identified as $Cu_6Sn_5$. The intermetallic zones 57 are relatively thin and regular and are indicative of the good metallurgical bond and joint strength.

As a comparison, FIG. 9 illustrates a solder joint, corresponding parts of which are indicated with reference numbers having a prime mark, which joint was formed and allowed to cool in the normal manner without the benefit of this invention. The solder 55′ has a coarse grainy structure and the intermetallic zones 57′ are thick and irregular indicating a poor metallurgical bond and inferior joint strength. Joints similar to those of FIG. 8 result when cooling is accelerated by blowing cold air directly on the solder 55 of the joint.

Figure 10:
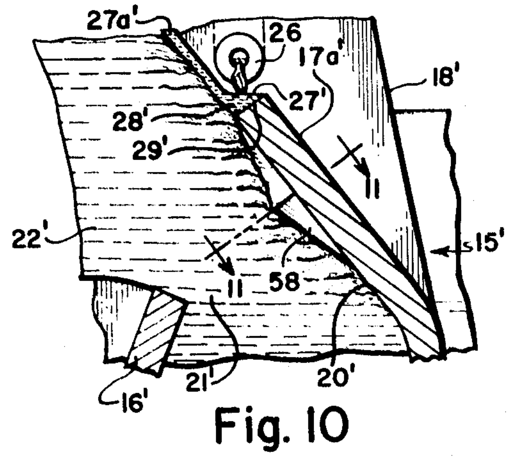
FIG. 10 is a view similar to FIG. 3 but showing a modified, ripple producing nozzle structure.
Figure 11:
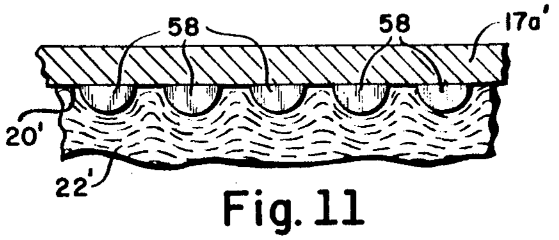
FIG. 11 is a fragmentary sectional view taken along line 11—11 of FIG. 10.

Referring now to FIGS. 10 and 11, there is illustrated a modified solder projecting nozzle 15′, comprising a sloping front wall 16′ and sloping rear wall 17′ disposed between side walls 18′ and 19′. The upper portion 17*a′* of rear wall 17′ extends above front wall 16′ and is bent forwardly to provide a solder deflecting surface 20′ above an elongated solder discharge orifice 21′. Thus far nozzle 15′ is like nozzle 15. In this embodiment however, there is provided a series of striation producing projections 58 disposed on the surface 20′.

The projections 58 are conveniently formed by spot welding and it will be noted that they are located a substantial distance below the oil reservoir forming surface 29′ at the upper edge of wall portion 17*a′*. This arrangement imposes forces on the moving solder stream 22′ which cause striations to appear in the upper surface thereof so as to provide a rippled crest of the character described with respect to the nozzle 15, but with a more predictable regularity of spacing and depth. The disposition of the projections 58 below the surface 29 permits the projections to impose the striation producing forces on the solder without introducing turbulence or interfering with the formation of an oil reservoir 28′ between the sloping upper end surface 29′ and the moving stream 22′ of solder.

Of course it is understood that the nozzles 15 and 15′ are merely given as examples of striation producing nozzles, and that other forms of nozzle may be used without departing from the spirit of the invention.

From the foregoing detailed description, it will be appreciated that there has been provided by this invention an improved means and method for rapidly forming solder joints which are of superior strength and reliability, and which are more readily checked by usual inspection. It will also be appreciated that the improved solder joints are achieved by forming a solder stream flowing in a direction opposite to the board travel and having forces therein tending to create longitudinal ripples and valleys which minimize the formation of backwash where the printed circuit board leaves the stream of solder, by utilizing a gentle wiping action to apply a thin oil film to the solder stream, and by controlling the rate of chilling or quenching the solder so as to form a fine grain structure therein and so as to form regular and thin intermetallic zones which provide the improved metallurgical bond and strength.

Of course the invention can be used to advantage in the soldering of other forms of connections, conductors and the like, for example in soldering of connections wherein a metal eyelet is used to establish electrical connection between conductor strips on opposite sides of a double sided printed circuit board, either with or without a component lead in the eyelet. Also, other forms of nozzle 15 may be used for forming the solder stream with the backwash alleviating striations therein, and other means than the ducts 26 may be used to maintain oil in the reservoir 28 so long as it does not disturb the wiping action by which the solder picks up a coating of oil.

Accordingly, although the invention has been described in considerable detail and with reference to a specific apparatus and method for practicing the invention, it will be understood that the invention is not limited thereto, but rather the invention includes all modifications, adaptations, equivalents, and uses as are reasonably embraced by the scope of the claims hereof.

Having described our invention, we claim:

1. Apparatus for soldering joints between a plurality of metallic elements forming part of a workpiece, said apparatus comprising:
(a) nozzle means for projecting a relatively wide, upwardly curving stream of molten solder having a curvilinear upper surface profile,
(b) said nozzle comprising means adapted to cooperate with the upper surface of said solder stream to define an oil reservoir, and
(c) means for supplying oil to said reservoir, whereby said upper surface of said solder stream wipes across oil in said reservoir and picks up a coating of said oil.

2. Apparatus as defined in claim 1 and wherein said nozzle comprises wall means for confining solder flow in an upward direction, and a deflector wall disposed at an angle to the upward flow and defining an outlet orifice from which the solder stream issues, said deflector wall having an upper edge surface partly defining said reservoir.

3. Apparatus as defined in claim 1 and wherein said nozzle comprises means for forming said solder stream with striations in the upper surface thereof and extending in the direction of solder flow.

4. Apparatus for soldering connections between a plurality of metallic elements associated with a surface on an insulating member, said apparatus comprising:
(a) nozzle means for projecting a relatively wide, upwardly curving stream of molten solder having a curvilinear upper surface profile, presenting a crest substantially above the level of said nozzle and to one side thereof,
(b) means for providing oil to said upper surface
(c) means for moving said insulating member and connections along a path of engagement with said crest and in a direction opposite to the solder flow, and
(d) said nozzle comprising means for forming said stream with striations in said upper surface and running in the direction of solder flow, whereby said striations provide a path for backwash solder to re-enter the solder stream from the zone of partition between said insulator member and said solder stream.

5. Apparatus as defined in claim 4 wherein said nozzle means comprises wall means defining a vertical flow channel for molten solder, and a deflector wall portion disposed at an angle over said vertical flow channel so as to define an outlet orifice through which solder is projected upwardly and outwardly from said nozzle.

6. Apparatus as defined in claim 4 and wherein said deflector wall portion is disposed at an acute angle to the vertical.

7. Apparatus for soldering a connection between a plurality of metallic elements at least one of which has a portion extending away from said joint, said apparatus comprising:
(a) nozzle means providing a supply of molten solder projected in a relatively wide, rippled upwardly curving stream having a curvilinear upper surface profile,
(b) means for providing oil to said upper surface,
(c) means for bringing said connection into and out of said solder supply for coating therewith, and
(d) cooling means for subjecting said element portion to a chilling medium after said connection is brought out of said solder supply.

8. Apparatus as defined in claim 7 wherein said oil provision means cooperates with said nozzle means to provide a film of oil which substantially completely and uniformly covers said curvilinear upper surfaces of said solder stream.

9. Apparatus as defined in claim 7 and wherein said chilling medium comprises a refrigerated gas and said cooling means comprises means for directing said gas against said element portion.

10. Apparatus for forming solder joints between a plurality of metallic elements disposed on one side of an insulating member with a least one of said elements having a portion exposed on the other side of the insulating member, said apparatus comprising:
(a) nozzle means for issuing a relatively wide, upwardly curving stream of molten solder rising a substantial distance above said nozzle means having a curvilinear upper surface profile,
(b) means for providing oil to said upper surface,
(c) means for transporting said insulating member so that said one side thereof and said elements travel through a portion of said stream for coating of said elements with molten solder, and
(d) means for subjecting said exposed portion of said one element to a cooling medium in predetermined relation to emergence of said elements from said stream, so that said molten solder is cooled evenly by transfer of heat from the interior thereof to the one element as well as from the exterior thereof to air surrounding the joint.

11. Apparatus as defined in claim 10 and wherein said cooling medium comprises a refrigerated fluid and said insulating member comprises a flat panel of material having low thermal conductivity as compared to said metallic elements, whereby said insulating member serves as a heat barrier between the cooling medium and the exterior of said molten solder.

12. Apparatus as defined in claim 1 and wherein said means for subjecting said exposed portion of said one element to a cooling medium comprises means for confining the flow of said refrigerated fluid to a predetermined zone on said other side of said insulating member.

13. Apparatus for forming fine grain solder joints between a plurality of metallic elements disposed on one side of an insulating member with one of said elements having a portion exposed on the other side of said insulating member, said apparatus comprising:
(a) means including a nozzle for issuing a rippled arcuate stream of molten solder, said stream being relatively wide and curving upwardly so as to have a curvilinear upper surface profile,
(b) means for transporting said insulating member so that said elements on said one side thereof pass through the crest of said stream for coating of said elements with molten solder
(c) oil reservoir means, located at a discrete position with respect to said nozzle and cooperating therewith to apply a film of oil on the surface of said stream between the nozzle and said insulating member, and
(d) means for subjecting said exposed portion of said element to a cooling medium in predetermined relation to emergence of said elements from said stream, whereby said molten solder is cooled evenly throughout.

14. Apparatus for soldering connections between metallic elements associated with an insulating member and having lead portions extending away from said connections, said apparatus comprising:
(a) nozzle means for projecting a relatively wide stream of molten solder to form an upwardly curving, curvilinear upper surface profile with such upper surface presenting a crest above the level of the nozzle and to one side thereof,
(b) means for moving said insulating member and connections along a path of travel into and out of engagement with said crest and in a direction opposite to the flow of solder in said stream, (c) said nozzle comprising means for cooperating with said upper surface of said solder stream to define an oil reservoir located at discrete positions in the nozzle structure so that said solder receives a film of oil by wiping across oil in said reservoir, and (d) means disposed above said path of travel for applying a quenching medium to said lead portions after said connections have travelled a predetermined distance out of said engagement with said crest, whereby solder clinging to said connections is cooled uniformly by dissipation of heat from the interior through said leads as well as through the exterior to surrouding air.

15. Apparatus as defined in claim 14 and wherein said means to apply quenching medium comprises a second nozzle means connected to a source of refrigerated fluid under pressure, and directional control means disposed between said second nozzle means and said path of travel.

16. Apparatus as defined in claim 14 and wherein the first mentioned nozzle means comprises means for forming striations in the upper surface of said solder stream and extending longitudinally of the direction of flow.

17. A method of forming a fine grain solder joint connecting a plurality of metallic elements, the method comprising the steps of:

(a) flowing a relatively wide, upwardly curving solder stream having a curvilinear upper surface profile covered by a thin film of oil over said elements while maintaining a portion of at least one of said elements exposed, (b) moving said elements with respect to said stream, so as to expose other of said plurality of elements to said stream, and (c) thereafter subjecting said exposed portion to a chilling medium, whereby heat is extracted from the interior of said joint to minimize thermal stresses and cooking therein.

18. A method of forming a solder joint as defined in claim 17 and comprising the step of shielding said joint from said chilling medium while subjecting said exposed portion thereto.

19. A method of forming a solder joint between a plurality of metallic elements disposed on one side of an insulating board and having a portion of one of said elements exposed on the other side of said board, the method comprising the steps of:

(a) moving said metallic elements on said one side of said board through a relatively wide, upwardly curving molten solder stream having a curvilinear upper surface profile so as to coat said elements therewith, (b) applying a film of oil to the solder coating said elements, and (c) directing a flow of chilling medium against said exposed portion of said one element on the other side of said board.

20. The method of forming a solder joint as defined in claim 19, and comprising the steps of directing a refrigerated gas as the chilling medium against said exposed portion of said one element.

21. A method of forming fine grain solder connections between a plurality of metallic elements and wherein a portion of at least one of said elements extends beyond the connection, said method comprising the steps of:

(a) applying molten solder to said elements while leaving said element portion exposed, said solder being in a relatively wide, upwardly curving stream having a curvilinear upper surface profile, (b) coating said molten solder with a thin film of oil, (c) allowing said solder to reach a quiescent state, and (d) subjecting said exposed element portion to a quenching medium, whereby said solder is cooled at a substantially uniform rate throughout.

22. A method of soldering connections between a plurality of metallic elements associated with a surface of an insulating member, the method comprising the steps of:

(a) forming a relatively wide, upwardly curving solder stream having a curvilinear upper surface profile, said stream having an upper surface with striations running longitudinally of the solder flow, (b) moving said insulating member surface and said elements along a path of travel opposite to said flow so as to bring said elements and insulating member into and out of engagement with said striated solder surface, whereby said connections are coated with solder, and (c) cooling said connections by subjecting exposed portions of said elements to a quenching medium.

23. A method of soldering connections between a plurality of metallic elements associated with an insulating surface, the method comprising the steps of:

(a) forming a relatively wide, upwardly curving solder stream having a curvilinear upper surface profile, said stream having a striated upper surface, (b) applying a film of oil to said striated surface, (c) moving said insulating surface and elements along a path of travel in a direction opposite to solder flow in said stream and into and out of engagement with the striated surface thereof so that oil coated solder clings to said elements, and (d) quenching the soldered connections by subjecting exposed portions of said elements to a cooling medium while shielding the solder on the elements from the cooling medium.

References Cited

UNITED STATES PATENTS 3,190,527 6/1965 Tardoskegyi ---------- 228—37

JOHN F. CAMPBELL, Primary Examiner

D. P. ROONEY, Assistant Examiner

U.S. Cl. X.R.

29—504; 228—37